United States Patent
Lehman et al.

(10) Patent No.: US 10,576,849 B2
(45) Date of Patent: Mar. 3, 2020

(54) CHILD SAFETY SEAT

(71) Applicant: Wonderland Switzerland AG, Steinhausen (CH)

(72) Inventors: David Andrew Lehman, Lancaster, PA (US); Kyle S. Mason, West Lawn, PA (US)

(73) Assignee: Wonderland Switzerland AG, Steinhausen (CH)

( * ) Notice: Subject to any disclaimer, the term of this patent is extended or adjusted under 35 U.S.C. 154(b) by 15 days.

(21) Appl. No.: 15/790,059

(22) Filed: Oct. 23, 2017

(65) Prior Publication Data
US 2018/0236904 A1    Aug. 23, 2018

Related U.S. Application Data

(60) Provisional application No. 62/461,992, filed on Feb. 22, 2017.

(51) Int. Cl.
*B60N 2/28* (2006.01)

(52) U.S. Cl.
CPC ........... *B60N 2/2806* (2013.01); *B60N 2/286* (2013.01)

(58) Field of Classification Search
CPC .............................. B60N 2/286; B60N 2/2806
USPC ....................................................... 297/250.1
See application file for complete search history.

(56) References Cited

U.S. PATENT DOCUMENTS

| 5,186,520 | A | | 2/1993 | Whitaker | |
| 5,335,968 | A | * | 8/1994 | Sheridan | A47D 1/004 297/250.1 |
| 5,432,985 | A | | 7/1995 | Bernart | |
| 6,152,528 | A | | 11/2000 | van Montfort | |
| 6,474,735 | B1 | | 11/2002 | Carnahan | |
| 6,508,510 | B2 | | 1/2003 | Yamazaki | |
| 6,592,183 | B2 | * | 7/2003 | Kain | B60N 2/2806 297/250.1 |
| 6,672,664 | B2 | | 1/2004 | Yanaka | |
| 6,676,212 | B1 | | 1/2004 | Amirault | |
| 6,832,813 | B2 | * | 12/2004 | Tomas | A47D 1/002 297/250.1 |
| 6,857,700 | B2 | | 2/2005 | Eastman | |
| 6,863,345 | B2 | * | 3/2005 | Kain | B60N 2/2806 297/250.1 |

(Continued)

FOREIGN PATENT DOCUMENTS

| AU | 527654 | 3/1983 |
| CN | 1346616 A | 5/2002 |

(Continued)

*Primary Examiner* — Syed A Islam

(74) *Attorney, Agent, or Firm* — Winston Hsu

(57) ABSTRACT

A child safety seat is for use on a vehicle seat. The vehicle seat has two anchors. The child safety seat includes a seat back, a seat bottom, and a latch belt. The seat bottom is connected to the seat back for cooperatively providing a seating space with the seat back. The latch belt has a connection strap, first and second branch straps extending from the connection strap, and two latches respectively connected to the first and second branch straps. The connection strap is connected to the seat back and is routed around the seat back together with the first and second branch straps, so as to make the two latches located at two lateral sides of the seat back respectively to be detachably engaged with the two anchors for fixing the child safety seat on the vehicle seat.

5 Claims, 7 Drawing Sheets

(56) References Cited

U.S. PATENT DOCUMENTS

| | | | |
|---|---|---|---|
| 6,916,066 B2 | 7/2005 | Sedlack | |
| 7,163,265 B2 | 1/2007 | Adachi | |
| 7,472,955 B2 | 1/2009 | Crane | |
| 7,926,874 B2 | 4/2011 | Hendry | |
| 7,988,230 B2 | 8/2011 | Heisey | |
| 8,141,950 B2* | 3/2012 | Boyer | B60N 2/2806 297/250.1 |
| 8,177,303 B2 | 5/2012 | Chen | |
| 8,262,161 B2* | 9/2012 | Fritz | B60N 2/2806 297/253 |
| 8,322,788 B2 | 12/2012 | Williams | |
| 8,328,281 B2* | 12/2012 | Balensiefer, II | B60N 2/2806 297/250.1 |
| 8,567,862 B2* | 10/2013 | Williams | B60N 2/2806 297/188.13 |
| 8,573,695 B2 | 11/2013 | Van Geer | |
| 8,845,022 B2 | 9/2014 | Strong | |
| 8,870,285 B2 | 10/2014 | Williams | |
| 8,936,314 B2* | 1/2015 | Lai | A47D 1/10 224/158 |
| 8,973,991 B2 | 3/2015 | Wuerstl | |
| 8,973,992 B2 | 3/2015 | Guo | |
| 9,156,379 B2 | 10/2015 | Williams | |
| 9,174,554 B2 | 11/2015 | Maciejczyk | |
| 9,308,838 B2 | 4/2016 | Miller | |
| 9,315,124 B2 | 4/2016 | Lehman | |
| 9,365,135 B2 | 6/2016 | Carpenter | |
| 9,439,517 B2* | 9/2016 | Cheng | A47D 15/006 |
| 9,499,074 B2 | 11/2016 | Strong | |
| 9,937,823 B2 | 4/2018 | Williams | |
| 9,963,051 B2 | 5/2018 | Strong | |
| 10,023,079 B2 | 7/2018 | Zhao | |
| 10,035,436 B2 | 7/2018 | Zhou | |
| 2002/0113470 A1 | 8/2002 | Kain | |
| 2003/0151286 A1 | 8/2003 | Kain | |
| 2003/0164632 A1 | 9/2003 | Sedlack | |
| 2004/0070244 A1 | 4/2004 | Williams | |
| 2005/0110318 A1 | 5/2005 | Meeker | |
| 2005/0151401 A1* | 7/2005 | Evans | B60N 2/26 297/250.1 |
| 2006/0138819 A1 | 6/2006 | Omar | |
| 2006/0261650 A1* | 11/2006 | Billman | B60N 2/28 297/250.1 |
| 2009/0066130 A1* | 3/2009 | Shafer | B60N 2/2806 297/256.16 |
| 2009/0127902 A1 | 5/2009 | Meeker | |
| 2011/0057489 A1* | 3/2011 | Greene | B60N 2/2806 297/253 |
| 2012/0200131 A1* | 8/2012 | Mason | B60N 2/2806 297/250.1 |
| 2013/0088058 A1* | 4/2013 | Szakelyhidi | B60N 2/2806 297/256.16 |
| 2014/0077544 A1* | 3/2014 | Gaudreau, Jr. | B60N 3/101 297/250.1 |
| 2014/0265489 A1 | 9/2014 | Morgenstern | |
| 2016/0311345 A1 | 10/2016 | Morgenstern | |
| 2016/0347210 A1 | 12/2016 | Mason | |
| 2016/0347212 A1 | 12/2016 | Mason | |
| 2017/0355287 A1 | 12/2017 | Anderson | |
| 2018/0056822 A1 | 3/2018 | Anderson | |

FOREIGN PATENT DOCUMENTS

| | | |
|---|---|---|
| CN | 1348887 | 5/2002 |
| CN | 101386275 A | 3/2009 |
| CN | 101508255 A | 8/2009 |
| CN | 102815235 A | 12/2012 |
| CN | 203254992 U | 10/2013 |
| CN | 103661024 A | 3/2014 |
| CN | 104527469 A | 4/2015 |
| CN | 204687882 U | 10/2015 |
| CN | 205468637 U | 8/2016 |
| CN | 205573679 U | 9/2016 |
| CN | 205674904 U | 11/2016 |
| DE | 25 22 285 A1 | 12/1975 |
| DE | 42 04 232 A1 | 9/1992 |
| DE | 10 2005 025 570 A1 | 12/2006 |
| DE | 10 2009 017 601 A1 | 10/2010 |
| DE | 10 2016 109 691 A1 | 12/2016 |
| EP | 1 393 967 A1 | 3/2004 |
| FR | 2 928 882 A1 | 9/2009 |
| GB | 2 282 321 A | 4/1995 |

* cited by examiner

CHILD SAFETY SEAT

CROSS REFERENCE TO RELATED APPLICATIONS

This application claims the benefit of U.S. Provisional Application No. 62/461,992, which was filed on Feb. 22, 2017, and is incorporated herein by reference.

BACKGROUND OF THE INVENTION

1. Field of the Invention

The present invention relates to a child safety seat, and more specifically, to a child safety seat having a latch belt connected to a seat back.

2. Description of the Prior Art

In general, a child safety seat utilizes two latch belts to hook two anchors on a vehicle seat for secure installation to properly restrain a child in the event of an accident. However, since the latch belt is simply stored or placed somewhere on the child safety seat and then is taken out to detachably connect a rear side of the child safety seat to the anchor on the vehicle seat when needed, the latch belt could be easily misplaced or lost while not in use, so as to cause a caregiver much inconvenience in use of the latch belt.

SUMMARY OF THE INVENTION

The present invention provides a child safety seat for use on a vehicle seat. The vehicle seat has two anchors. The child safety seat includes a seat back, a seat bottom, and a latch belt. The seat bottom is connected to the seat back for cooperatively providing a seating space with the seat back. The latch belt has a connection strap, first and second branch straps extending from the connection strap, and two latches respectively connected to the first and second branch straps. The connection strap is connected to the seat back and is routed around the seat back together with the first and second branch straps, so as to make the two latches located at two lateral sides of the seat back respectively to be detachably engaged with the two anchors for fixing the child safety seat on the vehicle seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
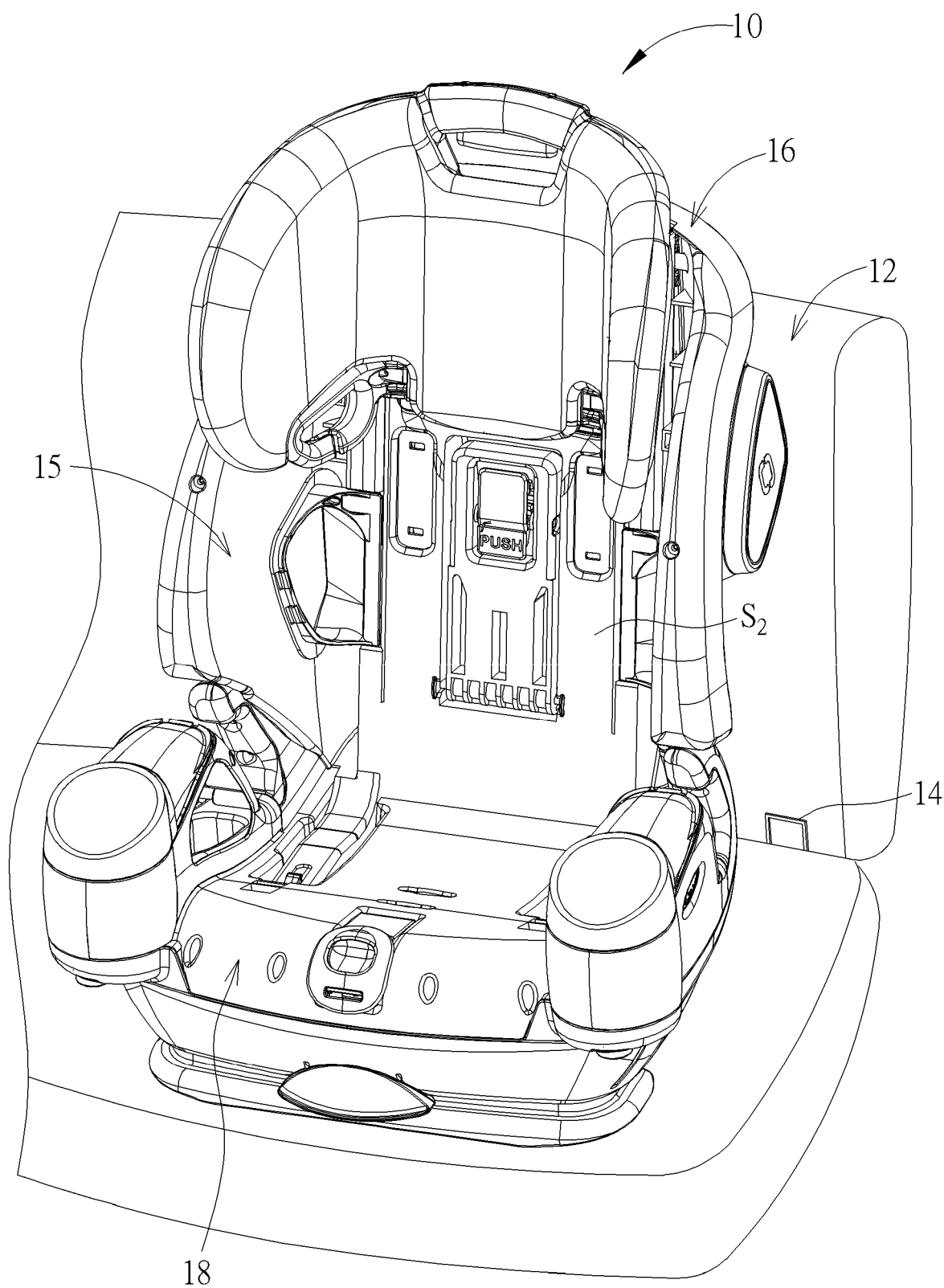
FIG. 1 is a diagram of a child safety seat being disposed on a vehicle seat according to an embodiment of the present invention.
Figure 2:
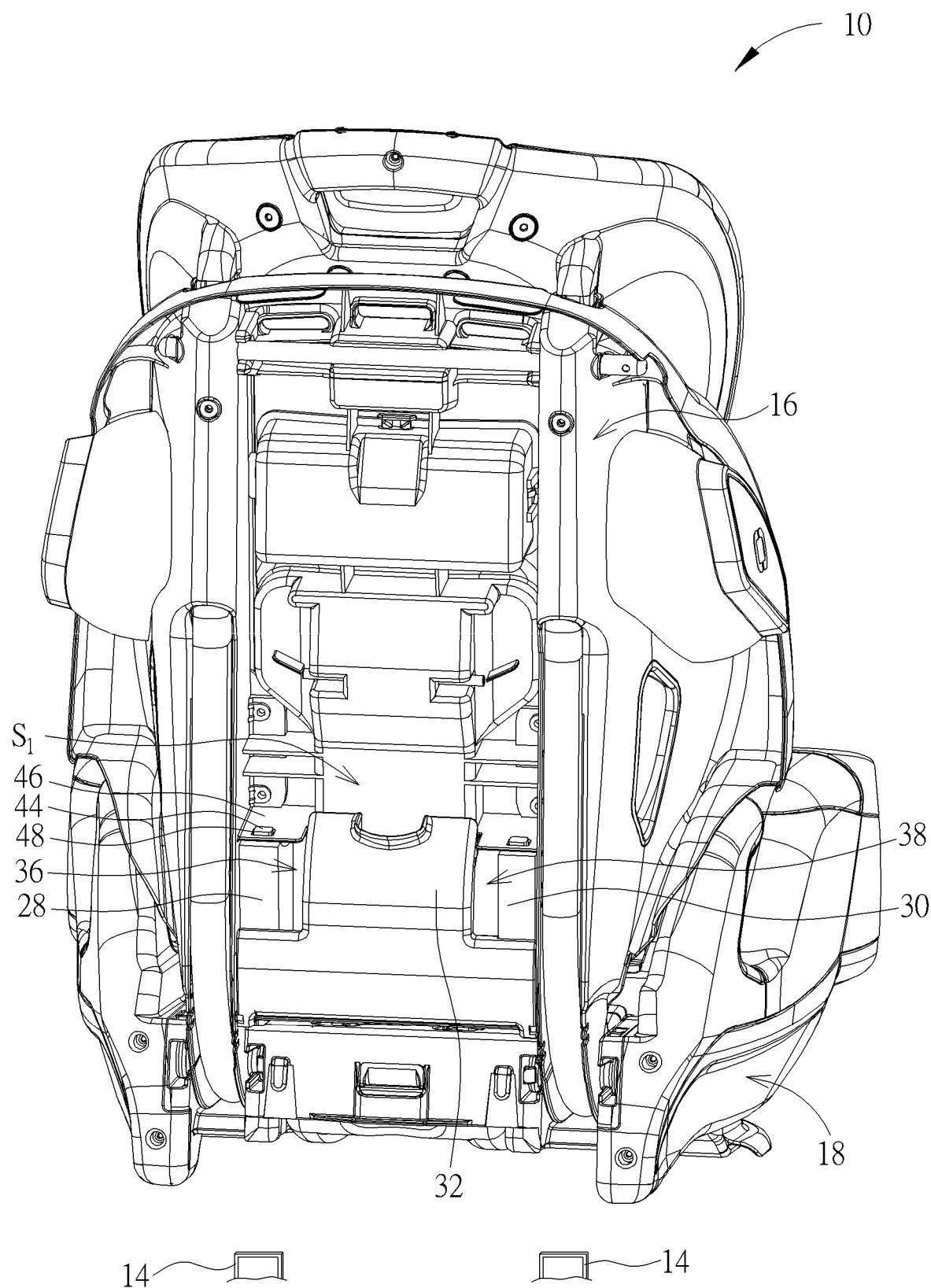
FIG. 2 is a diagram of the child safety seat in FIG. 1 from another viewing angle.
Figure 3:
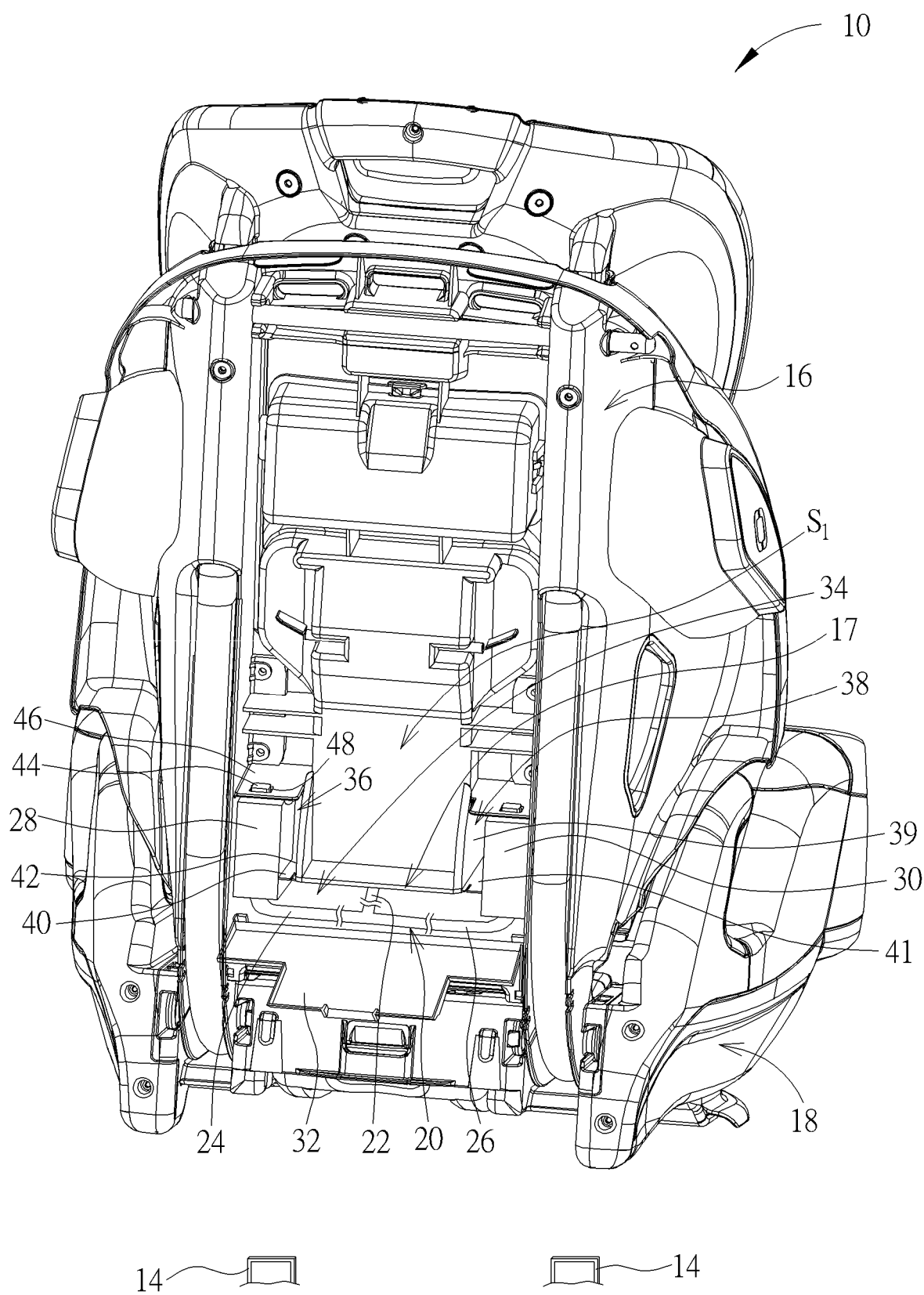
FIG. 3 is a diagram of a latch belt in FIG. 2 being stored in a storage space.

Please refer to FIG. 1, FIG. 2, and FIG. 3. FIG. 1 is a diagram of a child safety seat 10 being disposed on a vehicle seat 12 according to an embodiment of the present invention. FIG. 2 is a diagram of the child safety seat 10 in FIG. 1 from another viewing angle. FIG. 3 is a diagram of a latch belt 20 in FIG. 2 being stored in a storage space 17. As shown in FIG. 1, FIG. 2, and FIG. 3, a child safety seat 10 is for use on the vehicle seat 12 to properly restrain a child in the event of an accident. The vehicle seat 12 has two anchors 14, and the child safety seat 10 includes a seat back 16, a seat bottom 18, and the latch belt 20. The seat bottom 18 is connected to the seat back 16 for cooperatively providing a seating space 15 with the seat back 16, so that a child could sit in the seating space 15 comfortably. The latch belt 20 has a connection strap 22, a first branch strap 24, a second branch strap 26, and two latches 28, 30. The first branch strap 24 and the second branch strap 26 extend from the connection strap 22 respectively, and the latch 28 and the latch 30 are connected to the first branch strap 24 and the second branch strap 26 respectively. In an embodiment, the first and second branch straps 24, 26 are connected as one continuous strap, and the connection strap 22 forms a loop sliding along the continuous strap. In this embodiment, the seat back 16 could have the storage space 17 formed at a rear side $S_1$ of the seat back 16 for storing the latch belt 20, one end of the connection strap 22 could be attached to the rear side $S_1$ of the seat back 16, and the child safety seat 10 could further include a cover 32 (preferably inverted T-shaped, but not limited thereto) openably pivoted to the seat back 16 for covering the storage space 17.

To be more specific, please refer to FIG. 2 and FIG. 3. As shown in FIG. 2 and FIG. 3, the storage space 17 could have a strap storage region 34 for storing the connection strap 22, the first branch strap 24, and the second branch strap 26, and the storage space 17 could further have two latch storage regions 36, 38 located at two side of the strap storage region 34 for respectively storing the two latches 28, 30. In practical application, the child safety seat 10 could further adopt the latch positioning design. For example, as shown in FIG. 3, a limiting rib 40 could protrude from a side wall 42 of the latch storage region 36 and could laterally abut against the latch 28 for holding the latch 28 stored in the latch storage region 36 securely, and a limiting rib 41 could protrude from a side wall 39 of the latch storage region 38 and could laterally abut against the latch 30 for holding the latch 30 stored in the latch storage region 38 securely. Furthermore, a positioning hole 44 could be formed at a top wall 46 of the latch storage region 36, and the latch 28 could have a positioning rib 48 corresponding to the positioning hole 44. Accordingly, the positioning rib 48 can be inserted into the positioning hole 44 for positioning the latch 28 in the latch storage region 36 more securely. To be noted, the positioning hole design could be applied to the latch storage region 38 for positioning the latch 30 in the latch storage region 38 more securely, and the related description could be reasoned by analogy and omitted herein.

Figure 4:
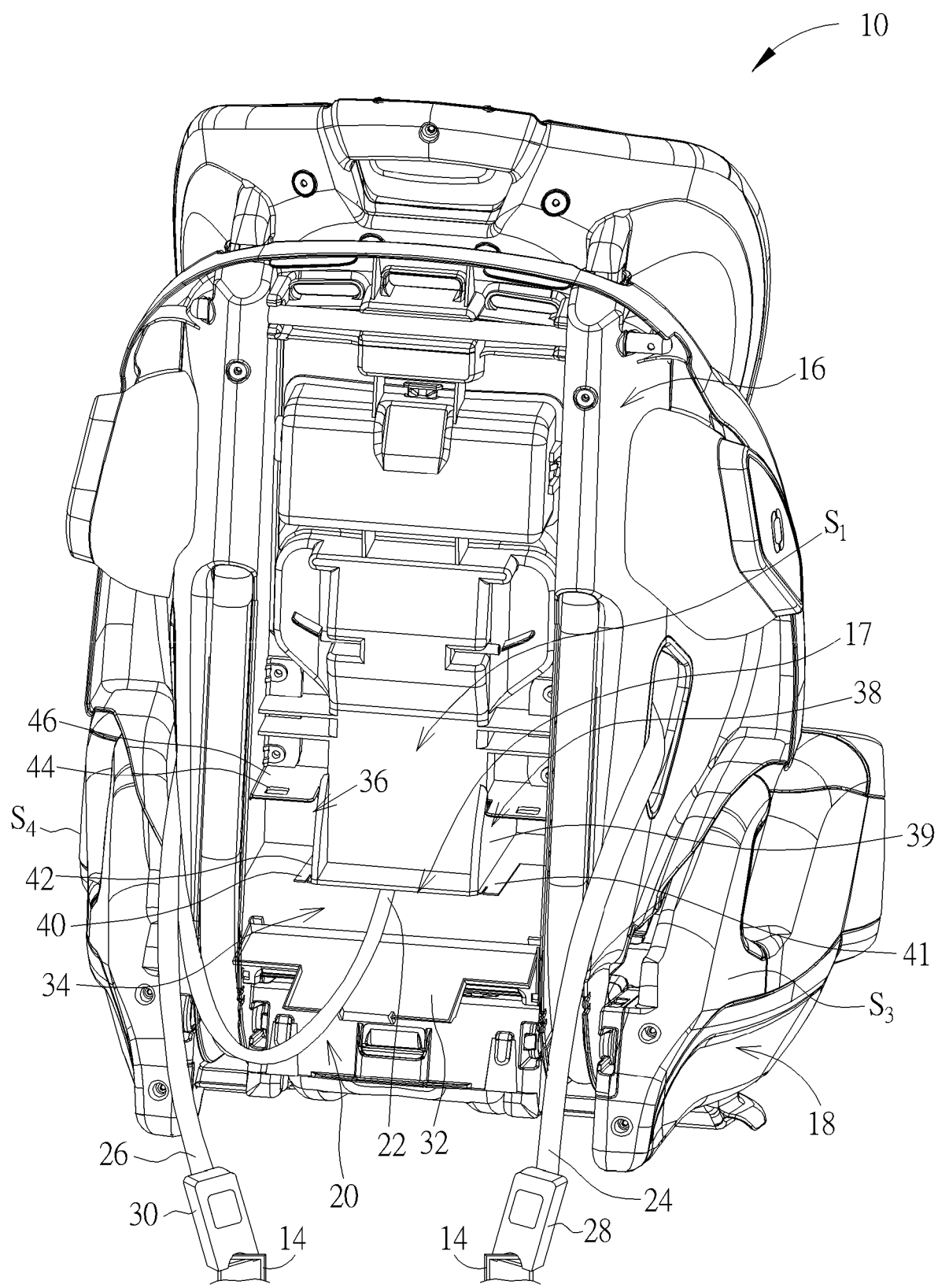
FIG. 4 is a diagram of the latch belt in FIG. 3 being pulled out of the storage space to be routed around a seat back.

Furthermore, in this embodiment, the latch belt 20 preferably adopts a push style latch design as shown in FIG. 4, which is a diagram of the latch belt 20 in FIG. 3 being pulled out of the storage space 17 to be routed around the seat back 16, and thusly needs to insert the positioning rib 48 into the positioning hole 44 for positioning the latch 28 in the latch storage region 36. In another embodiment, the latch belt 20 could adopt a hook style latch design instead. That is to say, the latch belt 20 could utilize a hook of a hook style latch to directly hook the positioning hole 44 for positioning the hook style latch in the latch storage region 36. As the hook style latch can be securely stored in the latch storage region 38 by hooking the positioning hole 44, the limiting rib 40 does not need to abut against the hook style latch in this embodiment. As for which latch positioning design is adopted, it depends on the practical application of the present invention.

Figure 5:
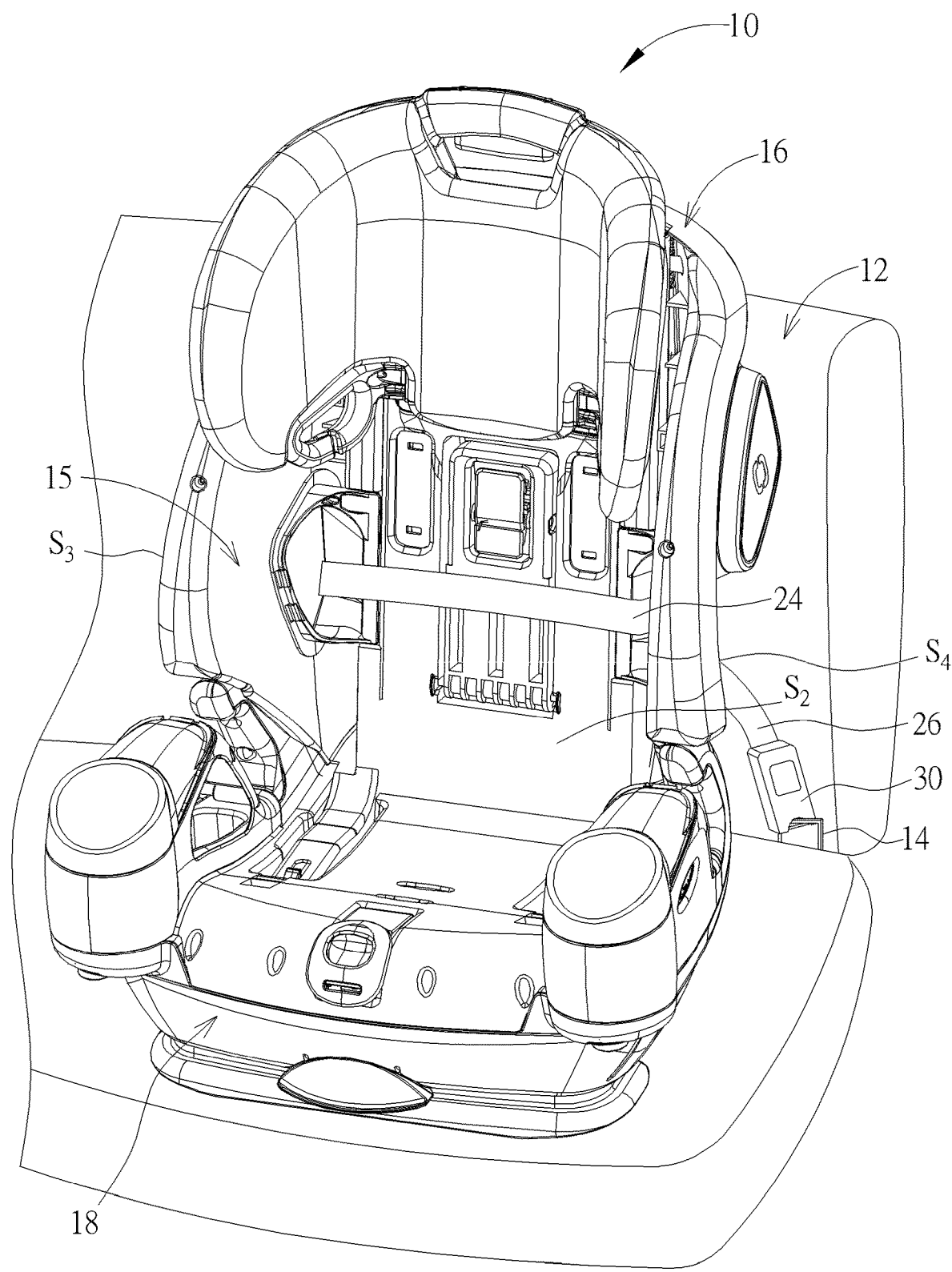
FIG. 5 is a diagram of a first branch strap in FIG. 4 being routed across a front side of the seat back toward a lateral side of the seat back.

More detailed description for storage and use of the latch belt 20 is provided as follows. Please refer to FIG. 2, FIG. 3, FIG. 4, and FIG. 5. FIG. 5 is a diagram of the first branch strap 24 in FIG. 4 being routed across a front side $S_2$ of the seat back 16 toward a lateral side $S_3$ of the seat back 16. As shown in FIG. 3, FIG. 4, and FIG. 5, when the latch belt 20 is not in use, the user can place the connection strap 22, the first branch strap 24, and the second branch strap 26 in the strap storage region 34, and then can put the latches 28, 30 into the latch storage region 36, 38 respectively. Subsequently, the user can utilize the cover 32 to cover the strap storage region 34 and partially cover the two latch storage regions 36, 38 for partially exposing the two latches 28, 30 (as shown in FIG. 2), so as to help the user clearly know where the two latches 28, 30 are stored for convenience of use.

On the other hand, when the user wants to utilize the latch belt 20, the user just needs to open the cover 32 (as shown in FIG. 3), and then takes the latches 28, 30 out of the latch storage regions 36, 38. Subsequently, the user can pull the latch belt 20 out of the storage space 17 and route the connection strap 22 around the seat back 16 together with the first branch strap 24 and the second branch strap 26, so as to make the two latches 28, 30 located at two lateral sides $S_3$, $S_4$ of the seat back 16 respectively (as shown in FIG. 4). To be more specific, the user can route the connection strap 22 from the rear side $S_1$ toward the front side $S_2$ of the seat back 16 for routing the first branch strap 24 across the front side $S_2$ toward the lateral side $S_3$ of the seat back 16 (as shown in FIG. 5) and routing the second branch strap 26 along the lateral side $S_4$ of the seat back 16. Finally, the user can utilize the latches 28, 30 located at the two lateral sides $S_3$, $S_4$ of the seat back 16 respectively (as shown in FIG. 4) to be detachably engaged with the two anchors 14. Accordingly, the child safety seat 10 can be fixed on the vehicle seat 12 via engagement of the latch 28 and the anchor 14 and engagement of the latch 30 and the anchor 14. In such a manner, the present invention not only adopts the design that the latch belt is directly connected to the rear side $S_1$ of the seat back 16 to solve the prior art problem that the latch belt could be easily misplaced or lost while not in use, but also fixes the child safety seat on the vehicle seat more securely by routing the latch belt across the front side of the seat back, so as to ensure that the child safety seat is not separate from the vehicle seat even in the event of an accident.

Figure 6:
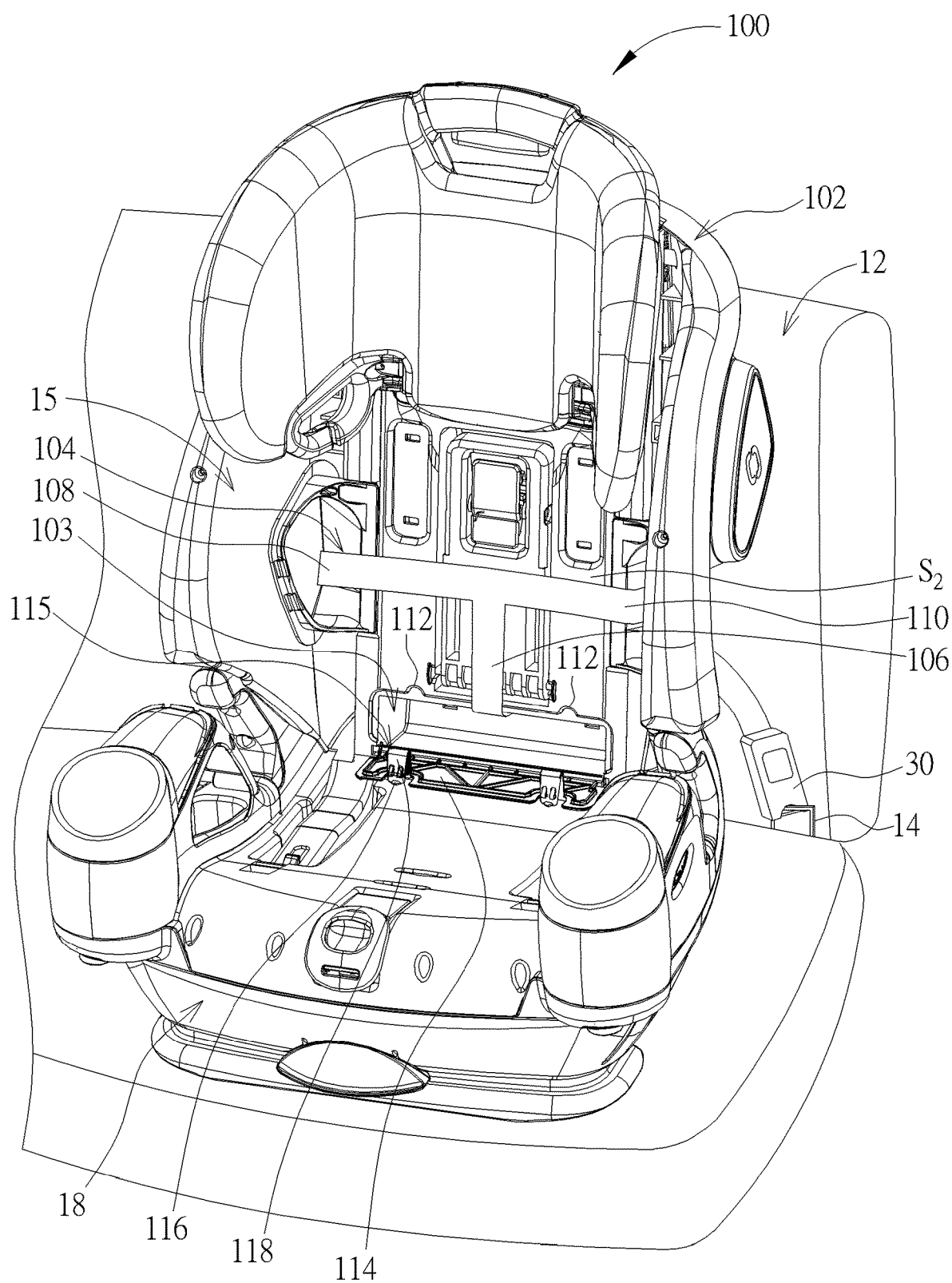
FIG. 6 is a diagram of a child safety seat being disposed on the vehicle seat according to another embodiment of the present invention.
Figure 7:
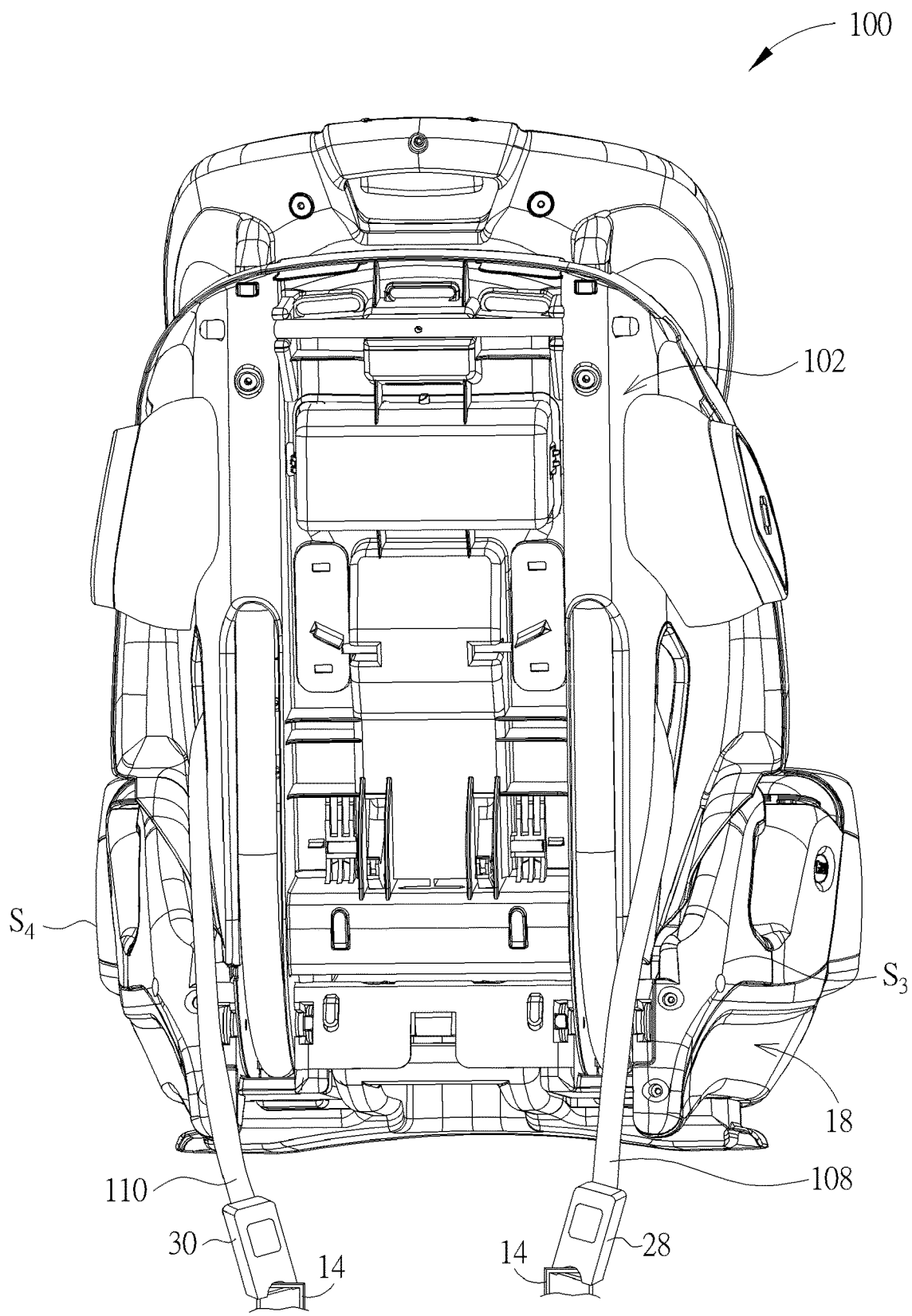
FIG. 7 is a diagram of the child safety seat in FIG. 6 from another viewing angle.

It should be mentioned that the latch storage design is not limited to the aforesaid embodiment. For example, please refer to FIG. 6 and FIG. 7. FIG. 6 is a diagram of a child safety seat 100 being disposed on the vehicle seat 12 according to another embodiment of the present invention. FIG. 7 is a diagram of the child safety seat 100 in FIG. 6 from another viewing angle. Components both mentioned in this embodiment and the aforesaid embodiment represent components with similar structures or functions, and the related description is omitted herein. As shown in FIG. 6 and FIG. 7, the child safety seat 100 is for use on the vehicle seat 12, and the child safety seat 100 includes the seat bottom 18, a seat back 102, and a latch belt 104. The seat bottom 18 is connected to the seat back 102 for cooperatively providing the seating space 15 with the seat back 102, so that a child could sit in the seating space 15 comfortably. The seat back 102 could have a storage space 103 formed at the front side $S_2$ of the seat back 102 for storing the latch belt 104, and the latch belt 104 could have a connection strap 106, a first branch strap 108, a second branch strap 110, and the two latches 28, 30. The first branch strap 108 and the second branch strap 110 extend from the connection strap 106 respectively, and the latch 28 and the latch 30 are connected to the first branch strap 108 and the second branch strap 110 respectively.

In this embodiment, one end of the connection strap 106 could be attached to the front side $S_2$ of the seat back 102, and the seat back 102 could have at least one engaging groove 112 (two shown in FIG. 6, but not limited thereto) and a cover 114. The engaging groove 112 is formed at a side of the storage space 103, and the cover 114 is openably hinged to an opposite side of the storage space 103 and has an engaging structure 115 corresponding to the engaging groove 112, so that the engaging structure 115 could be detachably engaged with the engaging groove 112 to fix the cover 114 to the front side $S_2$ of the seat back 102 when the cover 114 pivots to cover the storage space 103. To be more specific, as shown in FIG. 6, the engaging structure 115 could have a hook 116 and a bending arm 118. The bending arm 118 (preferably U-shaped, but not limited thereto) is connected to the hook 116 and the cover 114 for providing an elastic force to drive the hook 116 to be engaged with the engaging groove 112 when the cover 114 pivots to cover the storage space 103.

Via the aforesaid designs, when the latch belt 104 is not in use, the user places the connection strap 106, the first branch strap 108, the second branch strap 110, and the two latches 28, 30 in the storage space 103, and then utilizes the cover 114 to cover the storage space 103 for storing the latch belt 104 in the seat back 102. On the other hand, when the user wants to utilize the latch belt 104, the user just needs to push the hook 116 toward the cover 114 for detaching the hook 116 from the engaging groove 112, and then opens the cover 114 (as shown in FIG. 6). Subsequently, the user can pull the latch belt 104 out of the storage space 103, route the first branch strap 108 from the front side $S_2$ toward the lateral side $S_3$ of the seat back 102, and route the second branch strap 110 from the front side $S_2$ toward the lateral side $S_4$ of the seat back 102, so as to make the two latches 28, 30 located at two lateral sides $S_3$, $S_4$ of the seat back 102 respectively (as shown in FIG. 7). Finally, the user can utilize the latches 28, 30 located at the two lateral sides $S_3$/$S_4$ of the seat back 102 respectively to be detachably engaged with the two anchors 14 (as shown in FIG. 7). Accordingly, the child safety seat 100 can be fixed on the vehicle seat 12 more securely via engagement of the latch 28 and the anchor 14, engagement of the latch 30 and the anchor 14, and routing the latch belt 104 across the front side $S_2$ of the seat back 102, so as to ensure that the child safety seat 100 is not separate from the vehicle seat 12 even in the event of an accident.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A child safety seat for use on a vehicle seat, the vehicle seat having two anchors, the child safety seat comprising:
   a seat back having a storage space formed at a rear side of the seat back, the storage space having a strap storage region and two latch storage regions;
   a seat bottom connected to the seat back for cooperatively providing a seating space with the seat back;
   a cover openably pivoted to the seat back for covering the storage space; and
   a latch belt having a connection strap, first and second branch straps extending from the connection strap, and two latches respectively connected to the first and second branch straps, the strap storage region storing the connection strap and the first and second branch straps, the two latch storage regions being located at two side of the strap storage region for respectively storing the two latches, the cover covering the strap storage region and partially covering the two latch storage regions for partially exposing the two latches, the connection strap being connected to the rear side of the seat back and being routed around the seat back together with the first and second branch straps, so as to make the two latches located at two lateral sides of the seat back respectively to be detachably engaged with the two anchors for fixing the child safety seat on the vehicle seat.

2. The child safety seat of claim 1, wherein when the connection strap is pulled out of the storage space, the connection strap is routed from the rear side toward a front side of the seat back for routing the first branch strap across the front side toward one lateral side of the seat back and routing the second branch strap along the other lateral side of the seat back.

3. The child safety seat of claim 1, wherein the first and second branch straps are connected as one continuous strap, and the connection strap forms a loop sliding along the continuous strap.

4. The child safety seat of claim 1, wherein a limiting rib protrudes from a side wall of the latch storage region and laterally abuts against the corresponding latch for holding the corresponding latch stored in the latch storage region.

5. The child safety seat of claim 1, wherein a positioning hole is formed at a top wall of the latch storage region, the latch has a positioning rib or a hook corresponding to the positioning hole, and the positioning rib is inserted into the positioning hole or the hook hooks the positioning hole for positioning the latch in the latch storage region.

* * * * *